United States Patent [19]

Nakata et al.

[11] Patent Number: 5,436,076
[45] Date of Patent: Jul. 25, 1995

[54] COMPOSITE CORD FOR REINFORCING RUBBER

[75] Inventors: Hidekazu Nakata; Kenichi Okamoto; Akira Nagamine, all of Itami, Japan

[73] Assignee: Sumitomo Electric Industries, Ltd., Osaka, Japan

[21] Appl. No.: 315,503

[22] Filed: Sep. 30, 1994

Related U.S. Application Data

[63] Continuation of Ser. No. 123,038, Sep. 20, 1993, abandoned, which is a continuation of Ser. No. 746,805, Aug. 14, 1991, abandoned, which is a continuation of Ser. No. 299,567, Jan. 18, 1989, abandoned.

[30] Foreign Application Priority Data

Jan. 20, 1988 [JP] Japan .............................. 63-6117 U
Dec. 23, 1988 [JP] Japan ............................ 63-167069 U

[51] Int. Cl.⁶ .............................................. D02G 3/00
[52] U.S. Cl. .................................... 428/377; 428/379; 57/213; 57/216; 57/217; 57/902
[58] Field of Search ............... 428/377, 379; 57/153, 57/216, 213, 217, 210, 212, 237, 238, 218, DIG. 902

[56] References Cited

U.S. PATENT DOCUMENTS

| | | | |
|---|---|---|---|
| 2,448,782 | 9/1948 | Davis | 57/238 X |
| 3,601,970 | 8/1971 | Robets et al. | 57/153 |
| 3,631,667 | 1/1972 | Marzocchi | 57/162 |
| 4,333,507 | 6/1982 | Schmit et al. | 152/359 |
| 4,343,343 | 8/1982 | Reuter | 152/556 |
| 4,645,718 | 2/1987 | Dambre | 57/902 X |
| 4,683,175 | 7/1987 | Bakewell | 57/902 X |
| 4,732,197 | 3/1988 | Heishi et al. | 57/902 X |
| 4,777,789 | 10/1988 | Kolmes | 57/902 X |

FOREIGN PATENT DOCUMENTS

| | | |
|---|---|---|
| 144811 | 6/1985 | European Pat. Off. . |
| 59-29501 | 2/1984 | Japan ............... 57/210 |
| 1264118 | 2/1972 | United Kingdom . |

OTHER PUBLICATIONS

PCT 80/00069, Schmit et al "A Composite Reinforcement Cord For Reinforcing Elastomeric Articles" Published Jan. 24, 1980.

Primary Examiner—Patrick J. Ryan
Assistant Examiner—N. Edwards
Attorney, Agent, or Firm—Wenderoth, Lind & Ponack

[57] ABSTRACT

The present invention relates to a composite cord for reinforcing rubber comprising an organic chemical fiber cord and a high-carbon steel fine wire used by being buried in the rubber, for reinforcing rubber products such as various kinds of tires and conveyor belts. The composite cord comprises an organic chemical fiber cord wrapped by brass plated high-carbon steel fine wire.

7 Claims, 2 Drawing Sheets

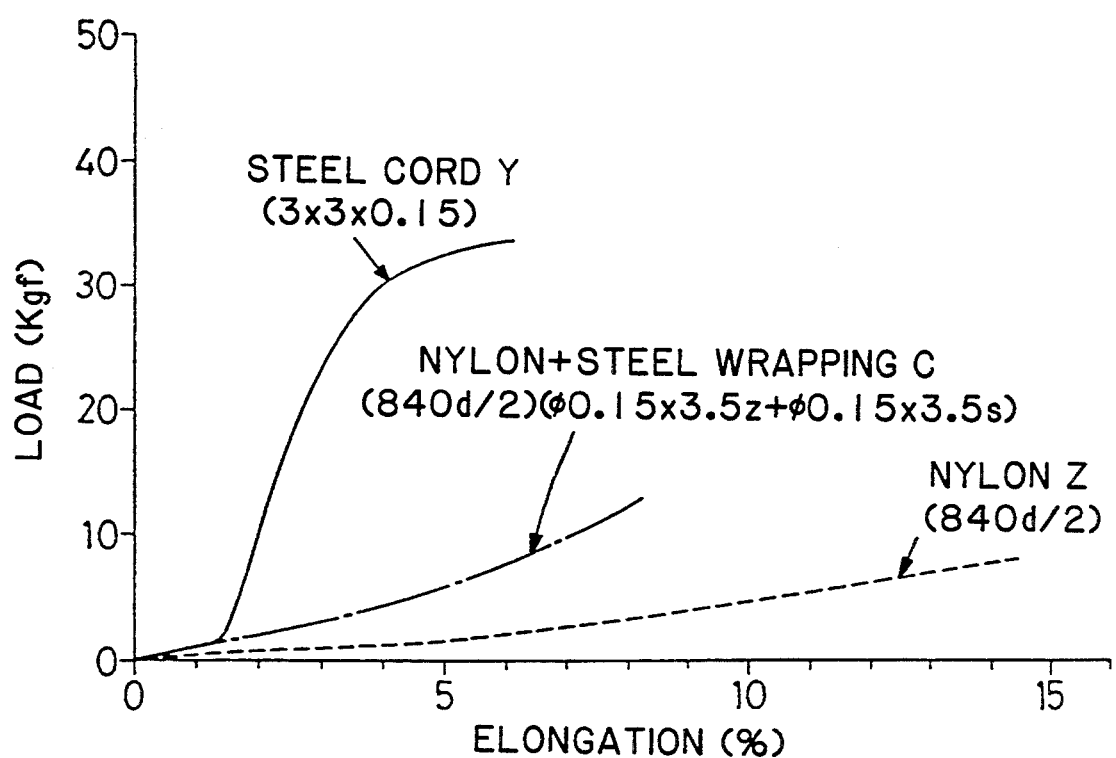

COMPOSITE CORD FOR REINFORCING RUBBER

This application is a continuation of now abandoned application, Ser. No. 08/123,038 filed Sep. 20, 1993, which is a continuation of now abandoned application, Ser. No. 07/746,805 filed Aug. 14, 1991, which is a continuation of now abandoned application, Ser. No. 07/299,567 filed Jan. 18, 1989.

DETAILED DESCRIPTION OF THE INVENTION

1. Field of the Invention

The present invention relates to a composite cord for reinforcing rubber comprising an organic chemical fiber cord and a high-carbon steel fine wire used by being buried in the rubber, for reinforcing rubber products such as various kinds of tires for use in vehicles and conveyor belts.

2. Prior Art

At present, a steel radial tire with a steel cord, a nylon cord, a polyester cord and the like as a main reinforcing material has been widely used as a tire for use in vehicles, in view of high-speed durability, driving stability, fuel cost and the like. The steel cord, which has been used in the above mentioned tire for use in a car, has been produced by stranding many pieces of brass (Cu-Zn) plated fine piano wires which contain 0.65 to 0.85% carbon content.

These brass plated fine wires whose diameter is 0.1 to 0.4 mm are brass plated at about 1 to 2 mm diameter, then drawn to fine wires. The brass-plated layer of the cord surface is necessary for an adhesion to rubber. In addition, a tensile strength of the steel fine wire is selected at 250 to 340 kgf/mm$^2$.

On the other hand, as to a tire for use in an airplane and a tire for use in a motorcycle, characteristics, such as superior elastic deformability and flexibility, are required, so that the conventional nylon cord and the like have been used but the steel cord and steel filament (fine wire) have never been used.

Problems to be Solved by the Invention

For example, in case of a tire for use in an airplane, the nylon cord, which is rich in elastic deformability and has shock-absorbing capacity, has been used to soften the shock at repeated landings. This nylon cord is wound along the under-tread periphery of the tire in the case that the tire rolls over objects, such as stones, during the rotation thereof, but if they are sharp, they break through the tread rubber and reach the nylon cord, whereby the nylon cord is injured and broken. Accordingly, the improvement of the cut resistance has been required to not only the tire itself but also the nylon cord. In addition, in case of the motorcycle tires frequently using the nylon cord and the like for reinforcing a belt in a similar manner, recently there is a tendency that the tire is large-sized and durable in high-speed, whereby an improvement of the endurance of the tire and the rigidity of the belt portion have been required in addition to the performances which have been required for this type of tire.

In order to match the improvement and the change of the performances required to both such tires, the constituent elements as a composite have to be chosen and combined skillfully or the performances of the constituent elements have to be improved. In view of the latter point, it has been required to find how to give cut resistance and rigidity without losing the original properties of the nylon cord.

Accordingly, the improved rigidity is required in addition to the conventional high-elongation characteristic, but a suitable cord has not been obtained yet.

For example, a high-elongation steel-cord [for example 3×3×0.15 (pitch; 1.7S/3.5S)] having these characteristics has been investigated. But it is required that the load-elongation curve for a high-elongation steel cord approaches the one for nylon cord. For instance, the load-elongation curve positioned between steel cord and nylon cord is required. (FIG. 3)

[Construction of the Invention]

The present inventors investigated to solve the above-mentioned problem. And as the result of this investigation, they found a composite cord for reinforcing rubber composed of a organic chemical fiber cord wrapped with two layers of brass plated high-carbon steel fine wire.

DESCRIPTION OF THE DRAWINGS

FIGS. 2 and 3 are curves showing the load-elongation relation of the composite cord of the present invention and that of the conventional cord, respectively.

Operation

Figure 1:
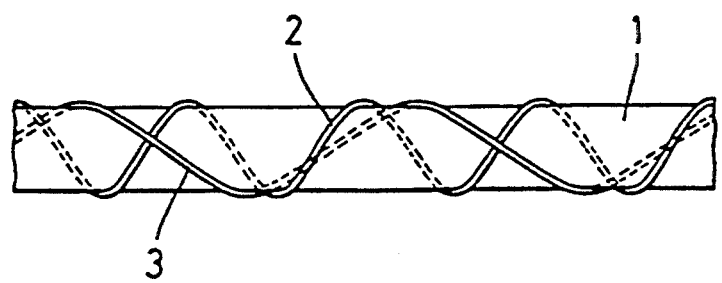
FIG. 1 is a sectional view showing a construction of the composite cord of the present invention.

Here, the organic chemical fiber cord is preferably subjected to the resourcin-formalin-latex treatment (hereinafter referred to as RFL treatment) to give an adhesion to rubber. The nylon cord and the like are treated by immersing in the resorcin-formalin-latex solution. The brass plated high-carbon steel fine wire is a steel filament (fine wire) which is a constituent element of the so-called steel tire cord. In the present invention the inventors found the composite cord in order to give cut resistance and rigidity to the organic chemical fiber cord without loss of the high-elongation characteristic of the fiber cord such as nylon cord.

On the other hand, the steel filament is characterized by a high strength, as above mentioned, but the elongation at break is low (about 1 to 2%). In order to obtain the high elongation characteristic for a composite cord without spoiling the characteristics of the nylon cord, it is required to increase a real length of the steel filament to a unit length of the composite cord. Furthermore, in order to realize the armoring role, the steel filament was spirally wound (that is, wrapped) around the fiber cord. Although even merely one layer of filament can realize its role by reducing a wrapping pitch to an extent of 0.4 to 7.0 mm, a residual torsion is generated in the composite cord as a result of processing with the steel filament. As a result, this composite cord is apt to be intensely twisted, whereby it can not be practically used.

The removal of this residual torsion requires a process such as retwisting of the composite cord, so that the operation becomes troublesome and increases the product cost.

So, the present inventors continued additional investigations to find that the residual torsion due to the wrapping of the first layer could be compensated by wrapping a second layer of steel filament around the surface of this composite cord in an opposite direction (for example if the former was an "S", the latter was a "Z" direction, and vice versa). In addition, the optimum conditions were investigated to find that if the wrapping pitch of the second layer was smaller than the first layer, then the opposite residual torsion is generated in the cord, and so by selecting the wrapping pitches of the layers in such a manner that the wrapping pitch of the second layer is larger than that of the first layer but less than five times as large as that of the first layer, the subsequent retwisting operation becomes unnecessary.

Next, the evaluation of the characteristics of the composite cord according to the present invention will be described.

The composite cord according to the present invention is a composite comprising a flexible and well-extendible organic chemical fiber cord and a hard and strong steel filament. The steel filament is adapted to be spirally and continuously wrapped around the fiber cord so that the composite may have the characteristics of both different materials together.

The diameter of the fine wire to be armored is selected at 0.12 to 0.25 mm and the wrapping pitch thereof is selected at 0.4 to 7.0 mm. This is because, since the steel filament is wrapped around the soft fiber cord, if the diameter of the steel filament is increased, the rigidity thereof is too increased, whereby an unreasonable force is applied to the fiber cord during the wrapping process, and at present the smallest diameter of the steel filament, at which it can be practically mass-produced, is 0.12 mm.

In addition, the smaller the wrapping pitch is, the more effective the armoring is, but the lower limit of the wrapping pitch was selected at 0.4 mm in view of the productivity in the wrapping process, and the upper limit of the wrapping pitch was selected at 7.0 mm since it does not remarkably spoil the elongation characteristics of the fiber cord. Though the wrapping pitch should be expressed by the wrapping angle, the fiber cord diameter used for tires is 0.5 to 1.0 mm and doesn't give a big change to the wrapping angle, so it is expressed by the real length.

The reason why the filament is wrapped in two layers with an opposite direction, and the pitch of the second layer is larger than that of the first layer but less than five times as large as that of the first layer, is that the residual torsion after the second wrapping is zero and the retwisting after wrapping is not needed.

However, in the case that the improvement of cut resistance is strongly desired, two or more steel filament wrapping layers can be used but five layers are suitable at most in view of increased weight. The optimum value of the pitch ratio may be selected on the basis of the same way of thinking as above described and it is not always limited by this ratio.

According to the present invention, the nylon cord and the polyester cord, which are most frequently used for tires for use in a vehicle, are most preferably used as the organic chemical fiber cord, but composite cords comprising rayon and an aramide fiber having different characteristics from rayon may be used. It is desired that these cords are subjected to the resorcin-formalin-latex (RFL) treatment to improve the adhesion thereof to rubber.

In addition, according to the present invention, high-carbon steel fine wire represented by the steel filament wrapped around the organic chemical fiber cord can be replaced by metallic wire of brass, copper, zinc and the like. Also in these cases, similar results to those in case of steel filaments can be obtained.

Preferred Embodiments

The preferred embodiments of the present invention will be below described with reference to FIG. 1.

EXAMPLE 1

In FIG. 1, a brass plated steel filament 2 having a diameter of 0.15 mm was wrapped around the nylon cord (840 d/2) 1 subjected to the RFL treatment and its pitch was 0.8 mm and the wrapping direction was "S", then the second filament 2 was wrapped with 1.5 mm pitch and a "Z" direction.

Figure 2:
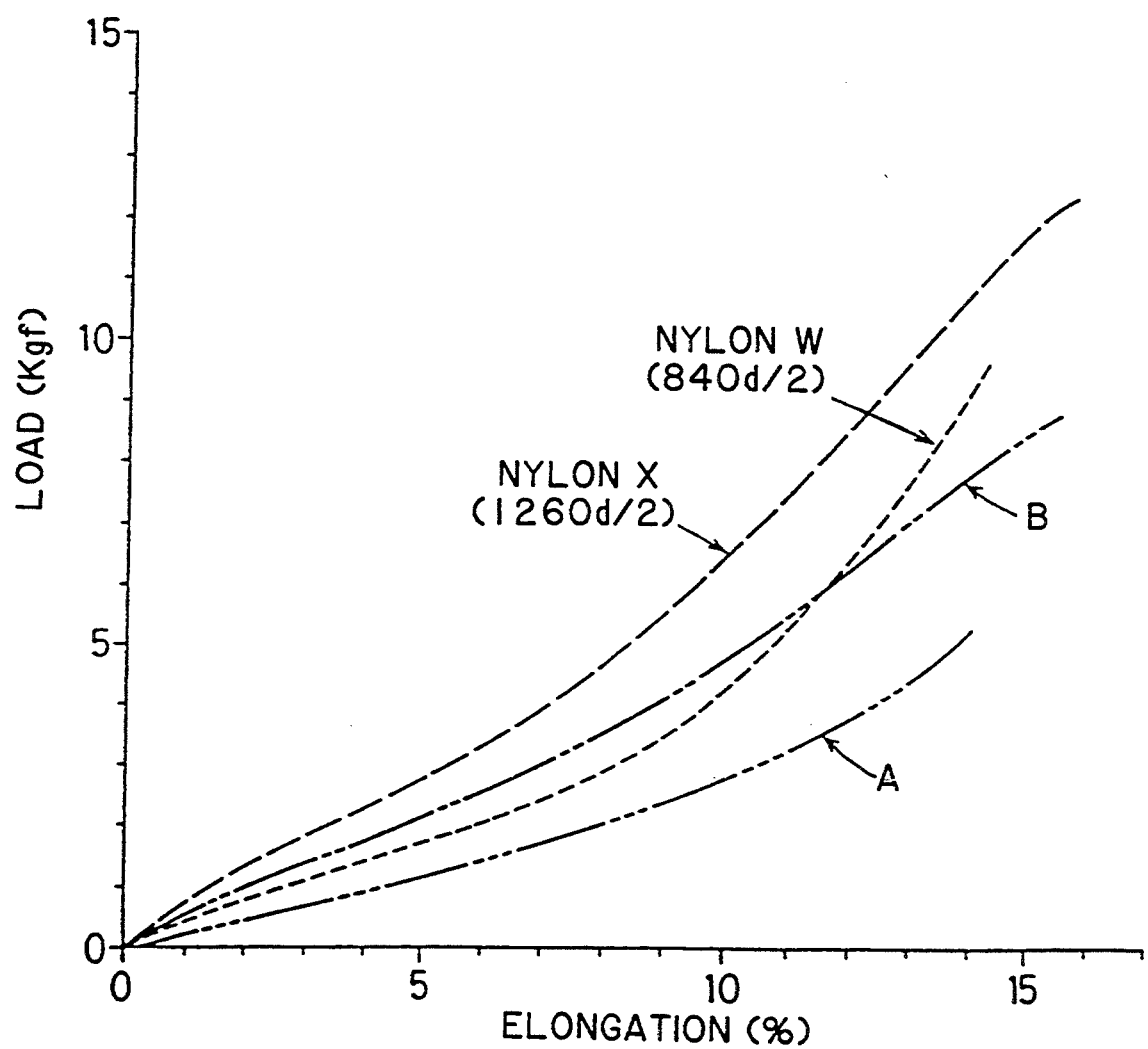

The load-elongation curve of such obtained composite cord and the conventional nylon cord is shown in FIG. 2.

Referring to FIG. 2, a curve A shows the load-elongation curve of the above-mentioned composite cord, a curve B shows one of a composite cord comprising a nylon cord (1,260 d/2) and a steel filament having a diameter of 0.15 mm wrapped with 0.88Z+1.39S, a curve W shows one of a nylon cord (840 d/2), and a curve X shows one of a nylon cord (1,260 d/2).

Referring to FIG. 3, a curve C shows a load-elongation curve of the composite cord comprising a nylon cord (840 d/2) and a steel filament having a diameter of 0.15 mm wrapped with 3.5S+3.5Z. A curve Y showing a steel cord 3×3×0.15 (1.7s/3.5s)HE for reference, and a curve Z showing a nylon cord for reference, also show a load-elongation curve.

The composite cords A, B according to the present invention shown in FIG. 2 hardly exhibit the reduction of elongation at break in comparison with the nylon cord. And, since the wrapping pitch of the steel filament is small, if the composite cords A, B according to the present invention are used in place of the nylon cord wound in the circumferential direction of the a tire as the belt cord of the tire for use in an airplane or a tire for use in an ultra-high performance car, a tire having a particularly superior cut resistance while maintaining high elongation at break can be obtained.

In addition, referring to FIG. 3, the characteristics of the composite cord C are positioned midway between the nylon cord Z used for the tire for use in a motorcycle and the 3×3×0.15 (1.7s/3.5s) HE cord Y. That is to say, the elongation characteristics of the nylon cord are slightly lowered but the nylon cord is remarkably improved in rigidity, thereby having a remarkably good influence on large-sized and high-speed vehicles.

EXAMPLE 2

A brass plated fine wire (piano wire) having a diameter of 0.15 mm was wrapped around a nylon cord to obtain a composite cord. The strength and elongation at break of this composite cord were measured with the results shown in Table 1.

In addition, a single nylon cord was shown for comparison.

TABLE 1

| | Single nylon cord | EXAMPLE 2-1 (Comparison) | EXAMPLE 2-2 (Invention) | EXAMPLE 2-3 (Comparison) |
|---|---|---|---|---|
| Construction | Nylon 1,260 d/2 pieces | Nylon + 0.15 mm | Nylon + 0.15 mm | Nylon + 0.15 mm |
| Wrapping direction of the fine wire (mm) | — | Unidirectional | Bidirectional | Tridirectional |
| Wrapping pitch of | Nylon is | 1.0Z | 1.0Z + 1.4S | 0.8Z + 0.8S + 3.0Z |

TABLE 1-continued

|  | Single nylon cord | EXAMPLE 2-1 (Comparison) | EXAMPLE 2-2 (Invention) | EXAMPLE 2-3 (Comparison) |
| --- | --- | --- | --- | --- |
| the fine wire | S-stranded |  |  |  |
| Twisting-in co-efficient of the fine wire(unidirectional) | — | 2.560 | 2.560 | 3.110 |
| Twisting-in co-efficient of the fine wire(bidirectional) | — | — | 2.254 | 4.243 |
| Twisting-in co-efficient of the fine wire(tridirectional) | — | — | — | 1.732 |
| Diameter of the composite cord (mm) | 0.65 | 0.90 | 1.20 | 1.50 |
| Breaking force of the composite cord (kgf) | 12.0 | 7.0 | 9.5 | 11.0 |
| Elongation at break (%) | 15 | 15 | 15 | 15 |

(Note)
The twisting-in coefficient was calculated by the following equation:

Twisting-in coefficient = $(\sqrt{(\pi D')^2 + P^2})/P$ wherein
P = Length of lay (mm)
D' = Pitch diameter (mm)

It was found from the above Table that the breaking force of the composite cord was lower than that of the single nylon cord but the elongation at break of the composite cord was on the same level as the single nylon cord.

Effects of the Invention

As above described, the cut resistance and rigidity of a tire can be improved by using the composite cord according to the present invention in various kinds of tires as the cord for reinforcing rubber in place of the conventional nylon cord and polyester cord, thereby greatly contributing to the improvement of tire performance.

What is claimed is:

1. A composite cord for reinforcing rubber, which comprises two high-carbon steel fine wires having a diameter of 0.12–0.25 mm wrapped in wrapping directions opposite to each other to form first and second layers around a nylon cord or a polyester cord, and wherein said first and second layers both have a length of lay in the range of 0.4–7 mm and the length of lay of the second layer is larger than that of the first layer but less than five times as large as the length of lay of the first layer, said composite cord having a residual torsion of zero.

2. A composite cord for reinforcing rubber as set forth in claim 1, wherein said steel fine wire is brass plated high-carbon steel fine wire, and said nylon cord or polyester cord has been subjected to a resorcin-formalin-latex treatment prior to wrapping.

3. A composite cord for reinforcing rubber as set forth in claim 2, in which the brass plated high-carbon steel fine wire has a brass plating layer formed of binary or more alloys based on Cu-Zn.

4. A composite cord for reinforcing rubber, which comprises two brass fine wires having a diameter of 0.12–0.25 mm wrapped in wrapping directions opposite to each other to form first and second layers around a nylon cord or a polyester cord, and wherein said first and second layers both have a length of lay in the range of 0.4–7 mm and the length of lay of the second layer is larger than that of the first layer but less than five times as large as the length of lay of the first layer, said composite cord having a residual torsion of zero.

5. A composite cord for reinforcing rubber as set forth in claim 4, wherein said nylon cord or polyester cord has been subjected to a resorcin-formalin-latex treatment prior to wrapping.

6. A composite cord for reinforcing rubber, which comprises two copper fine wires having a diameter of 0.12–0.25 mm wrapped in wrapping directions opposite to each other to form first and second layers around a nylon cord or a polyester cord, and wherein said first and second layers both have a length of lay in the range of 0.4–7 mm and the length of lay of the second layer is larger than that of the first layer but less than five times as large as the length of lay of the first layer, said composite cord having a residual torsion of zero.

7. A composite cord for reinforcing rubber as set forth in claim 6, wherein said nylon has been subjected to a resorcin-formalin-latex treatment prior to wrapping.

* * * * *